(12) United States Patent
Stillman et al.

(10) Patent No.: US 11,018,931 B2
(45) Date of Patent: May 25, 2021

(54) DATA DRIVEN USER INTERFACE FOR CONFIGURING DEVICE SETTINGS

(71) Applicant: VMware, Inc., Palo Alto, CA (US)

(72) Inventors: Eric Stillman, Cumming, GA (US); Kyle Barry, Marietta, GA (US)

(73) Assignee: VMware, Inc., Palo Alto, CA (US)

( * ) Notice: Subject to any disclaimer, the term of this patent is extended or adjusted under 35 U.S.C. 154(b) by 131 days.

(21) Appl. No.: 16/248,091

(22) Filed: Jan. 15, 2019

(65) Prior Publication Data
US 2020/0228400 A1    Jul. 16, 2020

(51) Int. Cl.
*H04L 12/24* (2006.01)
*H04L 29/08* (2006.01)
*G06F 9/451* (2018.01)

(52) U.S. Cl.
CPC .......... *H04L 41/0806* (2013.01); *G06F 9/451* (2018.02); *H04L 41/082* (2013.01); *H04L 41/084* (2013.01); *H04L 41/0866* (2013.01); *H04L 41/0883* (2013.01); *H04L 41/22* (2013.01); *H04L 67/34* (2013.01)

(58) Field of Classification Search
CPC . H04L 41/0806; H04L 41/082; H04L 41/084; H04L 41/0866; H04L 41/0883; H04L 41/22; H04L 67/34; G06F 9/451
USPC ........................................................ 709/220
See application file for complete search history.

(56) References Cited

U.S. PATENT DOCUMENTS 9,331,995 B2 * 5/2016 Schneider ................ G06F 21/43
9,721,223 B2 * 8/2017 Gentile .................. G06Q 10/08
9,729,746 B1 * 8/2017 Hong .................. H04N 1/00347
10,409,786 B2 * 9/2019 Mowatt .................... G06F 8/71
10,637,958 B1 * 4/2020 Akkala ................ H04L 67/303
2006/0073785 A1 * 4/2006 Klassen ................. H04L 67/34
                                                                455/3.01
2010/0217846 A1    8/2010 Styles
(Continued)

OTHER PUBLICATIONS

VMware AirWatch Mobile Device Management Guide, v. Oct. 2017, 1-217, (Oct. 2017) (Year: 2017).*
(Continued)

*Primary Examiner* — David P Zarka
(74) *Attorney, Agent, or Firm* — Clayton, McKay & Bailey, PC

(57) ABSTRACT

Examples described here include systems and methods for configuring device settings for a number of user devices across an enterprise. A management server can provide a user interface at an administrator console for creating a profile and identifying an associated device type. The management server can then retrieve a schema file associated with the device type. Based on information in the schema file, the management server can populate the user interface at the administrator console with available configuration options pertaining to the device type. An administrator can configure the options and send instructions to the management server to deploy the profile across the number of user devices. The management server can instruct each user device to download a device configuration application from an application repository and transmit the settings information to an agent application of the user device that has permission to configure the device configuration application.

20 Claims, 9 Drawing Sheets

(56) References Cited

U.S. PATENT DOCUMENTS

| | | |
|---|---|---|
| 2011/0010704 A1* | 1/2011 | Jeon .......................... G06F 8/61 |
| | | 717/178 |
| 2011/0208841 A1 | 8/2011 | Robertson |
| 2012/0317649 A1 | 12/2012 | Partee |
| 2013/0124009 A1* | 5/2013 | Esler ..................... H04L 67/125 |
| | | 701/2 |
| 2014/0189843 A1 | 7/2014 | Francisco |
| 2015/0277960 A1 | 10/2015 | Murray |
| 2015/0281870 A1* | 10/2015 | Sugaya ................. H04W 4/029 |
| | | 455/414.1 |
| 2018/0007140 A1* | 1/2018 | Brickell .................. H04L 67/42 |
| 2018/0247509 A1* | 8/2018 | Ashkenazi ......... G08B 13/2454 |

OTHER PUBLICATIONS

VMware AirWatch Android (Legacy) Platform Guide, v. Sep. 2018, 1-86, (Sep. 2018) (Year: 2018).*
VMware AirWatch Windows Phone Platform Guide, v. Sep. 2018, 1-64, (Sep. 2018) (Year: 2018).*
International Search Report and Written Opinion for Application PCT/US2020/013583 dated May 7, 2020.

* cited by examiner

DATA DRIVEN USER INTERFACE FOR CONFIGURING DEVICE SETTINGS

BACKGROUND

Configuring device and application settings across a number of devices in an enterprise setting can be cumbersome and inefficient. Typically, an administrator within an enterprise uses a Mobile Device Management ("MDM") or Enterprise Mobility Management ("EMM") system (collectively, "EMM systems") to support and configure devices across an enterprise.

The extent to which a device, and the applications residing on the device, can be configured are typically limited to options made available by either the device manufacturer or application developer. The manufacturer or developer will announce a feature newly available to customers and set up a dedicated application programming interface ("API") through which users can configure the new feature. However, in an EMM setting, several additional steps must be completed before an administrator can configure a new feature across some or all of the enterprise devices. For example, an EMM server must be updated such that it can communicate with the API corresponding to the new feature. Additionally, the administrator's console, through which the administrator communicates with the EMM server, must be updated to reflect the availability of the new feature. An agent application which resides on each enterprise device and is tasked with receiving and carrying out instructions transmitted from the EMM server must also be updated.

All of these burdensome steps can significantly delay the availability of new device and application features across the enterprise. In some cases, where the feature is not deemed critical or the enterprise is a relatively small one, these additional development steps may never be taken and the new feature is never made available on the enterprise devices.

As a result, a need exists for systems and methods that allow enterprises and their administrators to quickly make use of, and distribute, device and application features across enterprise devices.

SUMMARY

Examples described herein include systems and methods for configuring settings across a number of managed devices. An example method includes initiating a request from an administrator console to create a new device profile to be applied to one or more user devices. The request can be sent to a device management server and may include or be followed by information indicating a device type to which the profile will be applied.

Upon receipt of the request and device type information, the device management server may request a schema file from an application store. The schema file is associated with a configuration application for the device type and contains information pertaining to configurable device settings. Based on the received schema, the management server can generate a data driven user interface ("DDUI") to be displayed at the administrator console. The DDUI can include a plurality of configuration options identified in the schema. The configuration options can be presented in the form of one or more character string fields, choice types, multi-select options, and bundle arrays.

The administrator can then configure one or more settings associated with the device type using the DDUI at the administrator console and the configured settings information can be transmitted back to the device management server. In some examples, the management server can then transmit the settings information to the application store. The device management server can then send instructions to each of the one or more user devices to download the configuration application from the application store. Upon receipt of a request to download the configuration application from a user device, the application store will transmit the configuration application to the user device and configure the application in accordance with the settings information. In alternative embodiments, rather than sending the settings information to the application store, the device management server can also send the settings information received from the administrator console to the user devices. Specifically, the settings information can be transmitted to an agent application residing on each user device. After the configuration application is installed at a user device, the agent application can apply the settings information to the configuration application.

In such an example, a newly released device feature can be configured and distributed across enterprise devices without any need to update the administrator console, the device management server, or the agent application, as is the case in existing EMM systems.

The examples summarized above can also be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for configuring settings across a number of managed devices. A device management server can receive a request from an administrator console to create a new device profile for use in an enterprise. The request can include information identifying a device type to which the request is applicable.

The device management server can then request a device-specific settings configuration schema from an application store. Information contained in the schema can be used by the device management server to generate a DDUI at the administrator console, affording an administrator an opportunity to configure all available settings for the device type. The configured settings information can then be sent back to the device management server. The device management server can then send instructions to a user device within the enterprise to download a device-specific configuration application from the application store. The device management server can also transmit configured settings information to an agent application residing on the user device. The agent application, upon receipt of the settings information, can communicate the settings information to the configuration application also residing on the user device.

This process can be repeated any time a new feature is made available by a device manufacturer or any time an administrator chooses to create a relevant user/device profile. In this way, updating devices across an enterprise with access to a new feature can be accomplished without requiring any new hardcoding at the administrator console, the device management server, or the agent application of the user device. Additionally, the administrator console can adaptively display certain device settings within a profile-related interface, obviating the need for the administrator to access an application-specific user interface where the configuration application would need to be identified and configured directly.

Figure 1:
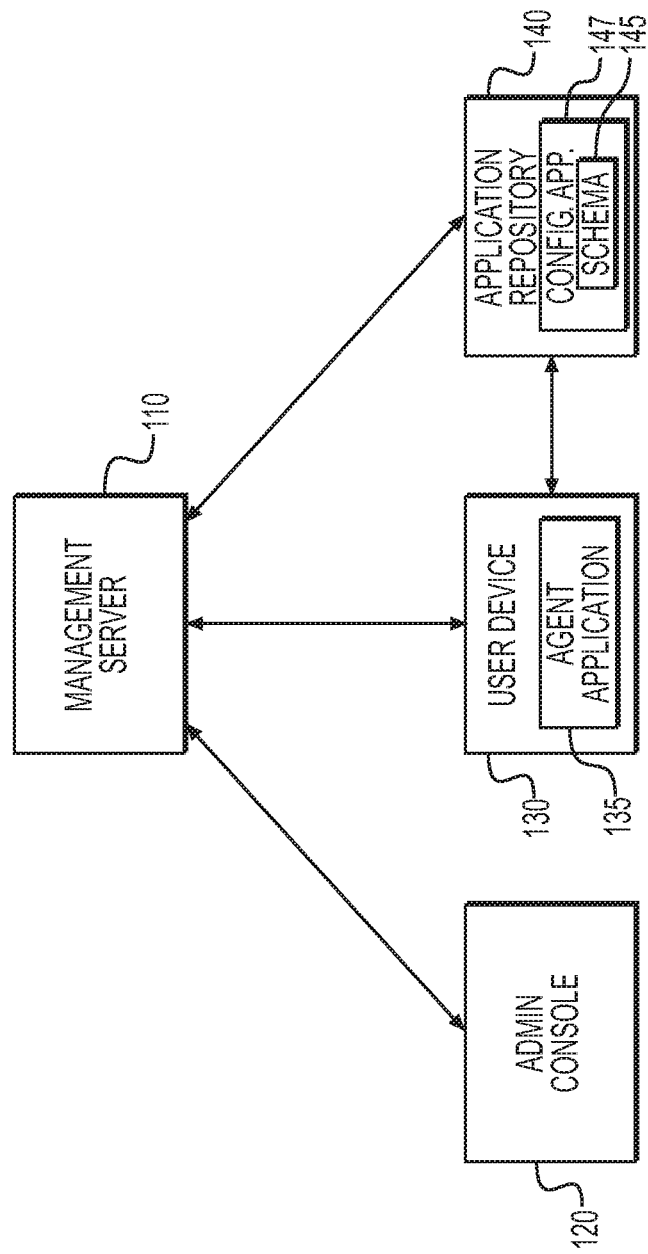
FIG. 1 is a system diagram of an example system for configuring settings across one or more user devices.
Figure 2:
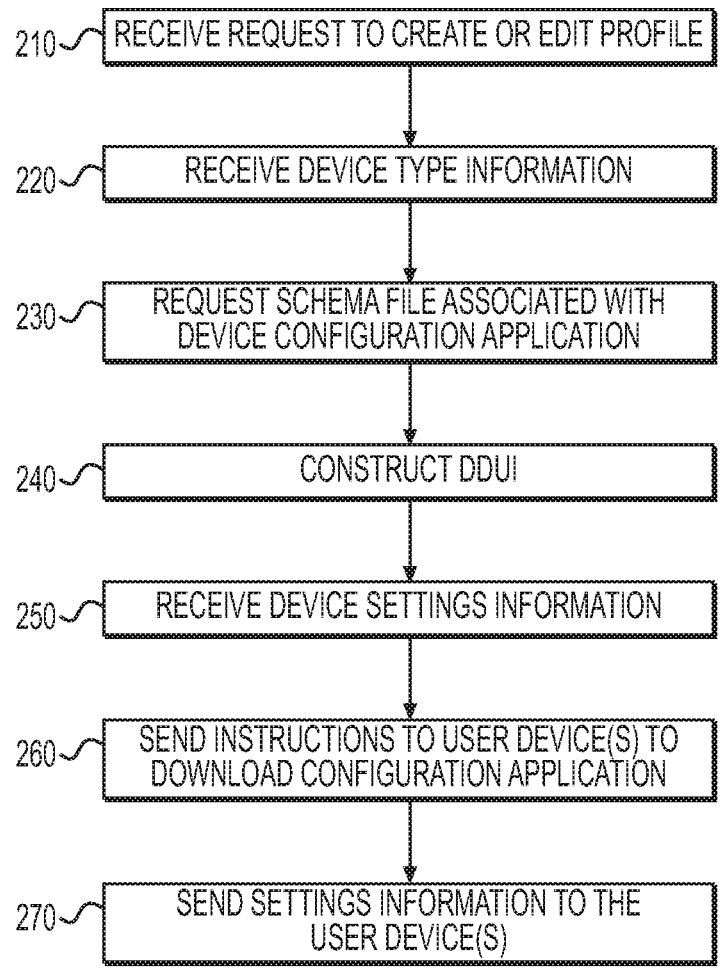
FIG. 2 is a flowchart of an example method for configuring settings across one or more user devices.
Figure 3:
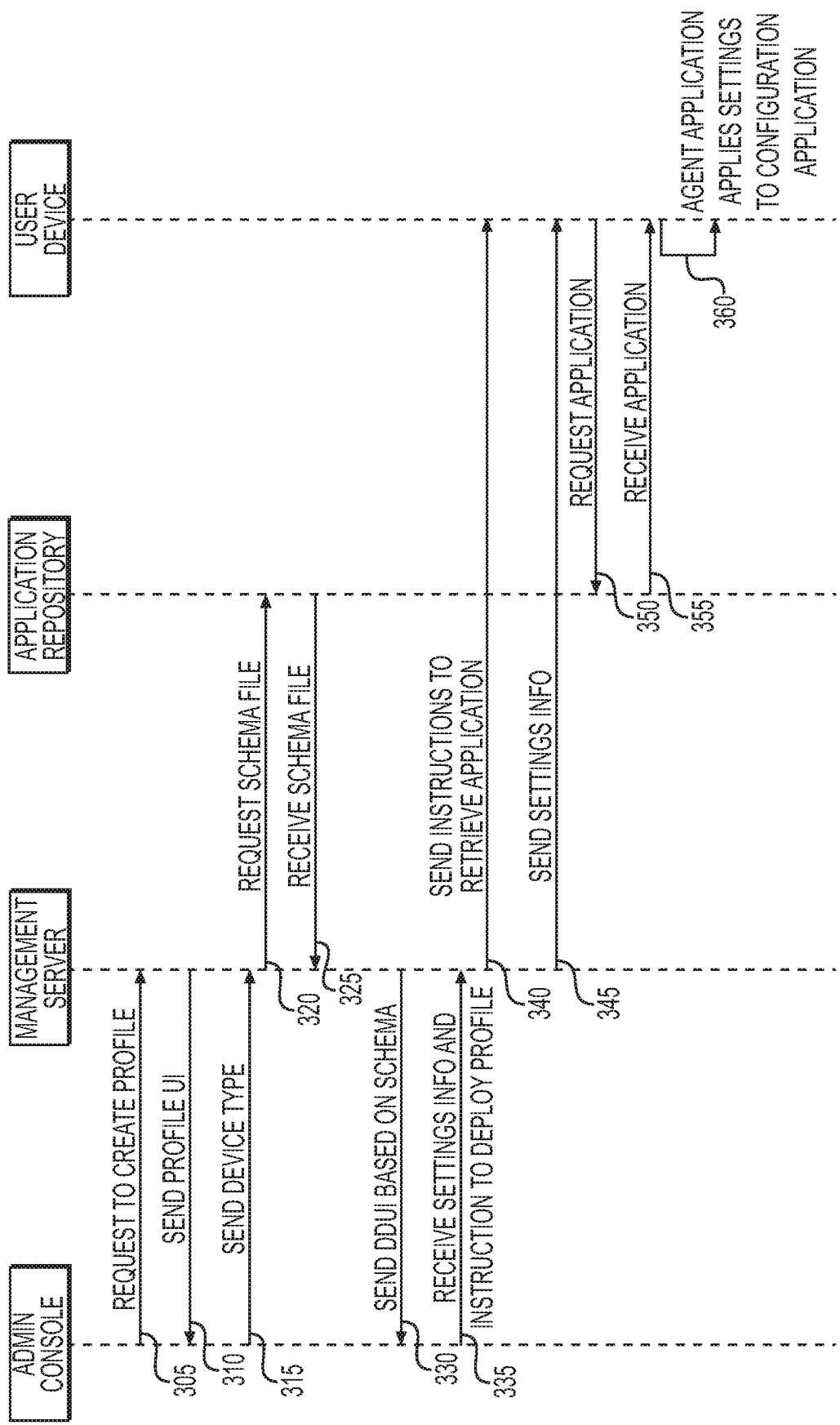
FIG. 3 is a sequence diagram of an example method for configuring settings across one or more user devices.

FIG. 1 provides an example system for configuring settings across a number of managed devices. FIGS. 2 and 3 provide a flowchart and a sequence diagram, respectively, of example methods for configuring and deploying the device settings. FIG. 3 provides a sequence diagram of an example method for configuring and deploying the device settings. FIGS. 4, 5, and 6A-6C provide illustrations of example user interfaces for configuring the device settings. FIG. 7 provides a flowchart of an example method for receiving settings feedback from managed devices.

Turning to FIG. 1, a system for carrying out the various methods described herein is depicted. System 100 can include a management server 110, an administrator console 120, one or more managed user devices 130, and an application repository 140. Management server 110 can include multiple servers, processors, and computing devices. In some examples, management server 110 is a network of servers, some of which can be located remotely from one another. In another example, management server 110 is a single server with multiple purposes. In yet another example, management server 110 is a server (or group of servers) dedicated to the operations described herein.

Management server 110 can be communicatively coupled to administrator console 120 via a network, such as the internet. An administrator can utilize console 120 to configure device settings and compliance rules to be applied to one or more of managed user devices 130. This can be accomplished using a DDUI displayed at console 120 (described in more detail below and with respect to FIGS. 4, 5, and 6A-6C). The administrator can access console 120 by, for example, navigating to a web location using a web browser on a computing device or accessing a standalone application on a computing device.

In use, an administrator using the DDUI at console 120 can first indicate a desire to create or edit a profile for managed device users. A profile can govern the use and available features of one or more applications, settings, and users of the managed devices 130. For example, a profile can be created to govern the use and available features pertaining to an email application residing on managed devices 130. The profile could include rules such as when and where email can be transmitted, data and file size restrictions, whitelists and blacklists for ingoing and outgoing mail, and rules governing the channels (such as a particular virtual private network "VPN") through which email is sent and received. The profile can also stipulate what settings or features of the email application will be available to a user and which will not. Any user device 130 to which the profile is applied would be governed by the specifications set forth in the profile. In practice, a number of profiles can be constructed, each containing rules governing one or more applications, settings, and user groups. Then one or more profiles can be applied to the managed devices 130 across an enterprise.

After indicating a desire to create or edit a profile, the administrator can then provide information indicating a device type to which the profile will apply. This can be done, for example, by selecting a device manufacturer or model number from a menu presented in the DDUI. In such an example, the device type information is then transmitted to the management server 110. In some examples, a device type can refer to the Original Equipment Manufacturer ("OEM") of the user device 130. The term "device type" is used interchangeably with an OEM type but is not necessarily limited to an OEM type.

Based on the received device type information, management server 110 can send a request to application repository 140, such as APP STORE or GOOGLE PLAY, requesting a schema file 145 associated with a configuration application 147 pertaining to the specified device type. For example, where the administrator indicates that a profile is to be associated with SAMSUNG devices, management server 110 would request a schema file 145 associated with a SAMSUNG configuration application from application repository 140. In some examples, the schema file 145 can be stored or accessed at a location remote from the application repository 140, such as at a separate server.

The schema file 145 is a file adhering to a predetermined structure or format that includes information identifying device settings that the device manufacturer has made available to its users for configuration. For instance, a device configuration schema file 145 can include information identifying configurable settings for WI-FI, BLUETOOTH, hotspot use, alerts, keyboards, and software update settings, to name a few. The schema file 145 can also include one or more available options for configuring each setting or feature.

Based on information contained in schema file 145 received from application repository 140, management server 110 can present all the configurable settings for the device type through a DDUI at administrator console 120. In one example, the profile creation or editing interface contains a number of "payloads," or subsets of configurable settings. A payload can contain related configuration settings, such as all location-based settings or all settings relating to camera access, for example. The device settings available for configuration can be reviewed by the administrator by selecting a device configuration payload generated based on the information contained in schema file 145. Additional details, and others associated with the DDUI, will be discussed in further detail with respect to FIGS. 4, 5, and 6A-6C.

After selecting the device configuration payload, the administrator can configure one or more of the available settings. This can be done through the selection of various elements and inputs into various fields in the DDUI, including parameter values, choice types, multi-select options, and bundle arrays, each of which is described in more detail below.

After the administrator has configured one or more of the available settings, this information can be transmitted along with other profile information to management server 110. Management server 110 can store the profile information, including the configured device settings information, for future recall by the administrator or others. Management server 110 can also deploy the profile, including the device settings, to one or more user devices 130 identified by the administrator at administrator console 120.

User devices 130 can include any computing device that includes a processor and a memory store, including a laptop or desktop computer, phone, tablet, or watch. Like administrator console 120, user devices 130 can be communicatively coupled to management server 110 and application repository 140 via a network, such as the internet.

In some examples, user devices 130 include an agent application 135 residing on the device. Agent application 135 can be a portion of an operating system for user device 130, or it can operate in the application layer of the user device 130. Specifically, the agent application 135 can be a dedicated application or other software installed on user device 130 that can monitor and control device settings, hardware components, and other applications installed on the user device 130.

To deploy the desired device settings received from administrator console 120 across one or more user devices 130 identified by the administrator, management server 110 can transmit the configured device settings information received from the administrator to application repository 140. Device management server 110 can then send instructions to each of user devices 130 to download configuration application 147 from application repository 140. Upon receipt of a request to download configuration application 147 from a user device 130, application repository 140 can transmit configuration application 147 to user device 130 and configure application 147 in accordance with the device settings information. In alternative embodiments, rather than sending the device settings information to application repository 140, device management server 110 can send the device settings information received from administrator console 120 to the user devices 130. Specifically, the device settings information can be transmitted to agent application 135 residing on each user device 130. After configuration application 147 is installed at a user device 130, agent application 135 can apply the device settings information to configuration application 147. In either case, the device settings configured by the administrator can be applied to each user device 130 automatically, without the administrator needing to manually identify configuration application 147 or provide instructions for downloading it.

In this manner, the administrator is able to fully configure every device setting made available by the device manufacturer through administrator console 120 without requiring any specific knowledge of device configuration application 147, schema file 145, or how schema 145 is used to construct the DDUI at console 120. In fact, the administrator need not be aware that configuration application 147 or schema file 145 exist or are necessary to the device settings configuration process.

Additionally, when a device manufacturer makes a new feature available for configuration, there is no need for software updates at administrator console 120, management server 110, or agent application 135 of user device 130. Rather, the administrator can simply create a new profile (or edit an existing one) and identify the relevant device type. Management server 110 can automatically retrieve the latest schema file from application repository 140. The latest schema file would include information necessary for management server 110 to generate a DDUI to be displayed at administrator console 120, including all available fields or elements for configuring the available device features, including any new ones. The remainder of the deployment process can then proceed as described above. Even in an instance when the device configuration application 147 requires an update before the newly released feature is available to user devices 130, that information can be contained in schema 145 and management server 110 can transmit an instruction to each identified user device 130 to download the latest version of the device configuration application 147 prior to agent application 135 implementing the new settings at device 130.

FIG. 2 provides a flowchart of an example method for configuring settings across a number of managed devices 130 from the perspective of management server 110. At step 210, management server 110 can receive a request to create or edit a profile from administrator console 120. As part of the same request, or at a next step 220, management server 110 can also receive information indicating a device type applicable to the profile request.

At step 230, management server 110 can send a request to application repository 140 to retrieve schema file 145 associated with the device type and a device configuration application 147. In some examples, this request is performed using an API call to the application repository 140. The API call can be made to the application repository 140 itself or to a separate server that provides the schema file 145.

At step 240, management server 110 can then use information located in the received schema file 145 to populate a DDUI for display at administrator console 120. The administrator can input configuration information using the DDUI to govern device settings on any user devices 130 to which the profile will be applied. The device settings information is then received at management server 110 at step 250. The device settings information can be included in an instruction from the administrator console to deploy the settings across one or more identified user devices 130, or the instruction to deploy the settings can be sent as part of a separate transmission.

Based on an instruction received from administrator console 120 to deploy the created or edited profile to one or more identified user devices 130 belonging to the device type, at step 260, management server 110 can send instructions to each such user device 130 to confirm that the configuration application 147 is present on the device 130, and if not, to download the device configuration application 147 from the application repository. Alternatively, management server 110 can download the device configuration application 147 from the application repository and provide it to the identified user devices 130 directly. For example, the management server 110 can push the application 147 down to each identified user device 110 or can send a notification or instruction to each user device 110 to retrieve the application 147 from a specified location.

Regardless, at step 270, management server 110 can also send the device settings information received from administrator console 120 to each identified user device 130. In some examples, management server 110 sends the device settings information to the agent application 135 installed on each user device 130. In such examples, the agent application 135 can then apply the appropriate settings to the device configuration application 147 also stored at the user device 130.

Alternatively, at step 270, management server 110 can send the device settings information to application repository 140 instead of directly to user devices 130, such that when a user device 130 requests to download configuration application 147 from application repository 140, application repository 140 can both transmit configuration application 147 to user device 130 and configure application 147 in accordance with the device settings information. This process is described in more detail above. Depending on the deployment method used, step 260 does not necessarily precede step 270. Where the device settings information is transmitted to application repository 140 from management server 110 instead of to user devices 130, step 270 may precede step 260, or the two steps can be performed in overlapping fashion.

FIG. 3 depicts a sequence diagram of an example method for configuring settings across a number of managed devices 130 in an enterprise environment. At stage 305, a request to create or edit a profile is generated at administrator console 120. In response to the request, at stage 310, management server 110 can generate a first page of a DDUI, requesting the administrator select a device type to which the profile will be associated, and cause the page to be displayed at the console 120. In some embodiments, the administrator can provide device type information in conjunction with the initial request to create or edit the profile.

At stage 320, management server 110 requests a schema file 145 associated with the device type from application repository. In some examples, schema file 147 is either associated with, or contained in, a device-specific configuration application available through repository 140. The schema file request may or may not be routed through an API of the repository.

At stage 325, application repository 140 transmits schema file 145 to management server 110. As discussed above, schema file 145 contains information indicating all configurable options and settings for the device type. In some cases, schema file 145 further contains one or more predetermined input options for configuring the available options and settings.

Based on the information contained in schema file 145, management server 110 can transmit information to administrator console 120 at stage 330 for displaying a DDUI containing all the available options and settings, and any predetermined input options. Further details regarding the DDUI are discussed below with respect to the remaining figures.

The administrator can then input device settings information at the DDUI displayed on administrator console 120. At stage 335, the device settings information provided by the administrator can be transmitted to management server 110. In conjunction with stage 335, or as part of a separate stage, administrator console 120 can also send a request to management server 110 to deploy the profile across one or more user devices 130 within an enterprise that have been identified by the administrator.

At stage 340, management server 110 can send instructions to each identified user device 130 to download the device configuration application associated with schema file 145 from repository 140. Before, during, or after stage 340, management server 110 can also transmit the device settings information transmitted from administrator console 120 to user devices 130 at stage 345. In some embodiments, the device settings information is sent to agent applications 135 residing on each user device 130. As described previously, in alternative embodiments, management server 110 can send the device settings information to application repository 140 rather than user devices 130.

Regardless, in response to receiving instructions to download the configuration application 147 from management server 110, user devices 130 can send a request to application repository 140 to download the device configuration application 147 at stage 350. And at stage 355, the device configuration application 147 is received at user devices 130.

At stage 360, in an embodiment where the device settings information was transmitted to user devices 130 from management server 110 at stage 345, the settings information received at user devices 130 is used to apply the desired settings to the device configuration application 147 now installed at the user devices. Specifically, the agent application 135 installed at each user device 130 applies the received settings information to the device configuration application 147. Either the agent application 135 or the device configuration application 147 can apply or enforce those settings at the user device 130.

In an alternative embodiment where the device settings information was transmitted to application repository 140 at stage 345, at stage 360 (and stage 355), application repository 140 can apply the device settings information to configuration application 147 in conjunction with the application download process.

In further examples, rather than management server 110 instructing user devices 130 to download the device configuration application 147, management server 110 can download the device configuration application 147 from application repository 140 and then push the configuration application down or otherwise make it available to user devices 130.

In alternative embodiments to those presented in FIGS. 2 and 3, the administrator may not be required to provide the device type as described above with respect to step 220 and stage 315, respectively. For example, there may be instances where the user of a user device 130 initiates an enrollment process that alerts the administrator that a profile needs to be applied to the user device 130. In such an example, a request to initiate the enrollment process can be transmitted from user device 130 to management server 110, and management server 110 can relay the request to administrator console 120. A device type can be identified as part of the request to initiate the enrollment process by the user, agent application 135, or some other component of user device 130. In this manner, when the administrator receives an enrollment request at administrator console 120, information identifying the device type can be included in the request. In further embodiments, where profiles containing settings information pertaining to that device type have already been created, the administrator can be afforded the opportunity to select that previously created profile and have it applied to the user device. The administrator may also, however, decide to reconfigure the settings associated with the previously created profile or configure settings associated with a new profile for the device type and the user device 130. In such cases, the processes depicted in FIGS. 2 and 3 resume at step 230 and stage 320, respectively.

Figure 4:
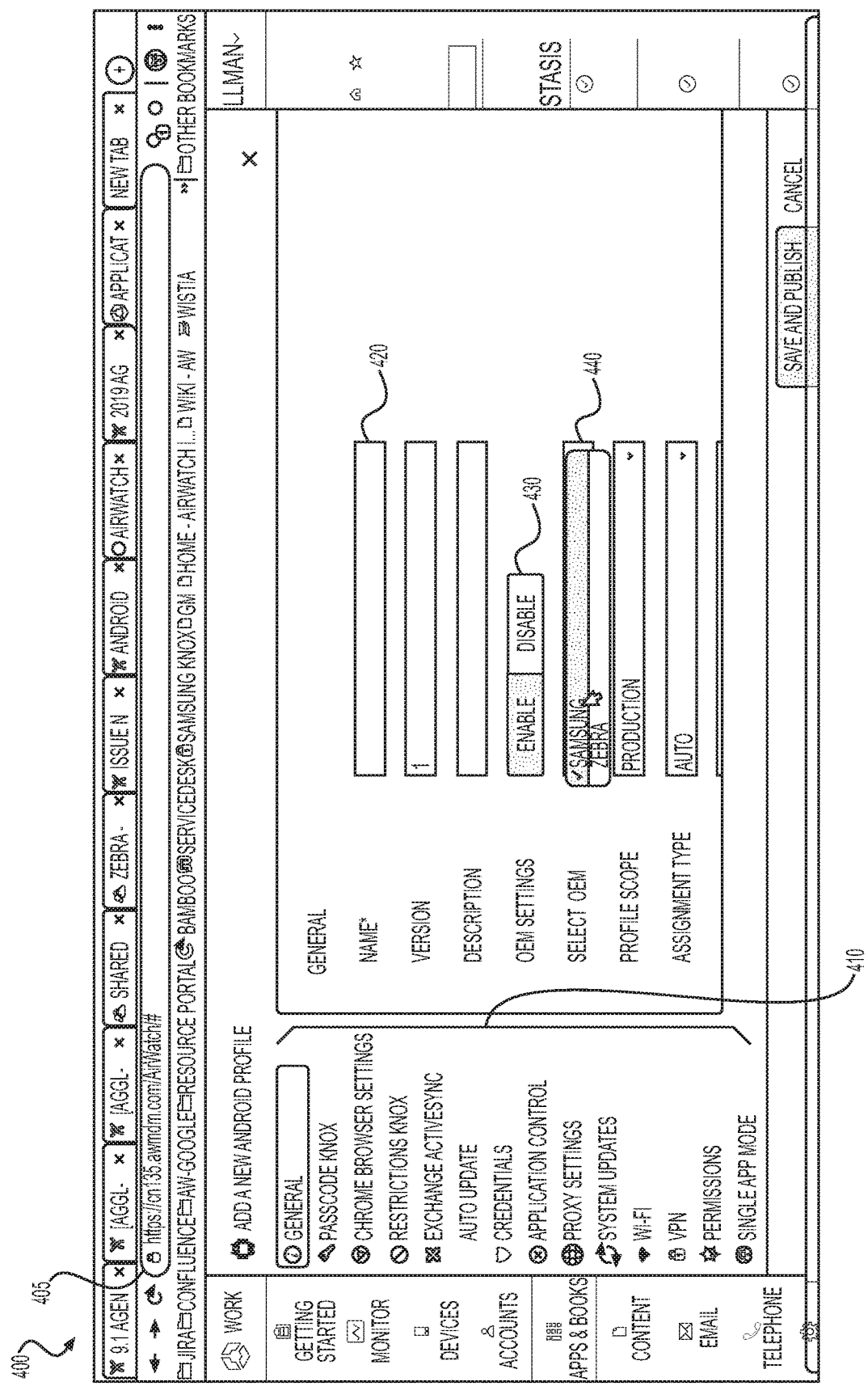
FIG. 4 is an illustration of an example user interface for configuring settings across one or more user devices.

FIG. 4 depicts a DDUI that can be displayed at an administrator console for collecting information from an administrator configuring settings across a number of managed devices in an enterprise environment. Screen 400 depicts a profile creation screen. In other examples, however, screen 400 may displayed to edit an existing profile. In this example, the administrator interacts with the DDUI by navigating a web browser to an address 405. On a prior screen (not shown here), the administrator may also have indicated that the profile to be created will be for devices operating on the ANDROID platform, though other profiles can be created for devices operating on the IOS platform or other operating systems.

A list of payloads 410 is provided on the left side of screen 400. As described above, payloads are subsets of configurable settings within a profile. A payload can include various configuration options for a device, an application, an operating system, communication rules or restrictions, content access rules and restrictions, and security certificates, to name a few. In the example shown, the administrator has indicated a desire to configure the "general" options payload. Within this payload, the administrator can provide a name for the profile in character field 420. The administrator can also elect whether he or she would like to configure device-specific or OEM settings by enabling or disabling an "OEM Settings" choice type option 430. If OEM Settings is enabled at element 430, the administrator can select device type information (i.e., a device manufacturer) at drop-down menu 440. Though the available options shown in this example is limited to manufacturers, the drop-down menu could also be populated with device model information such that multiple options available in the menu are made by the same manufacturer. Drop-down menu 440 can be a choice type option where the administrator may only select one device type or manufacturer from the provided list, or it can be a multi-select option where the administrator can identify multiple device types or manufacturers to associate with the profile being created or edited.

Figure 5:
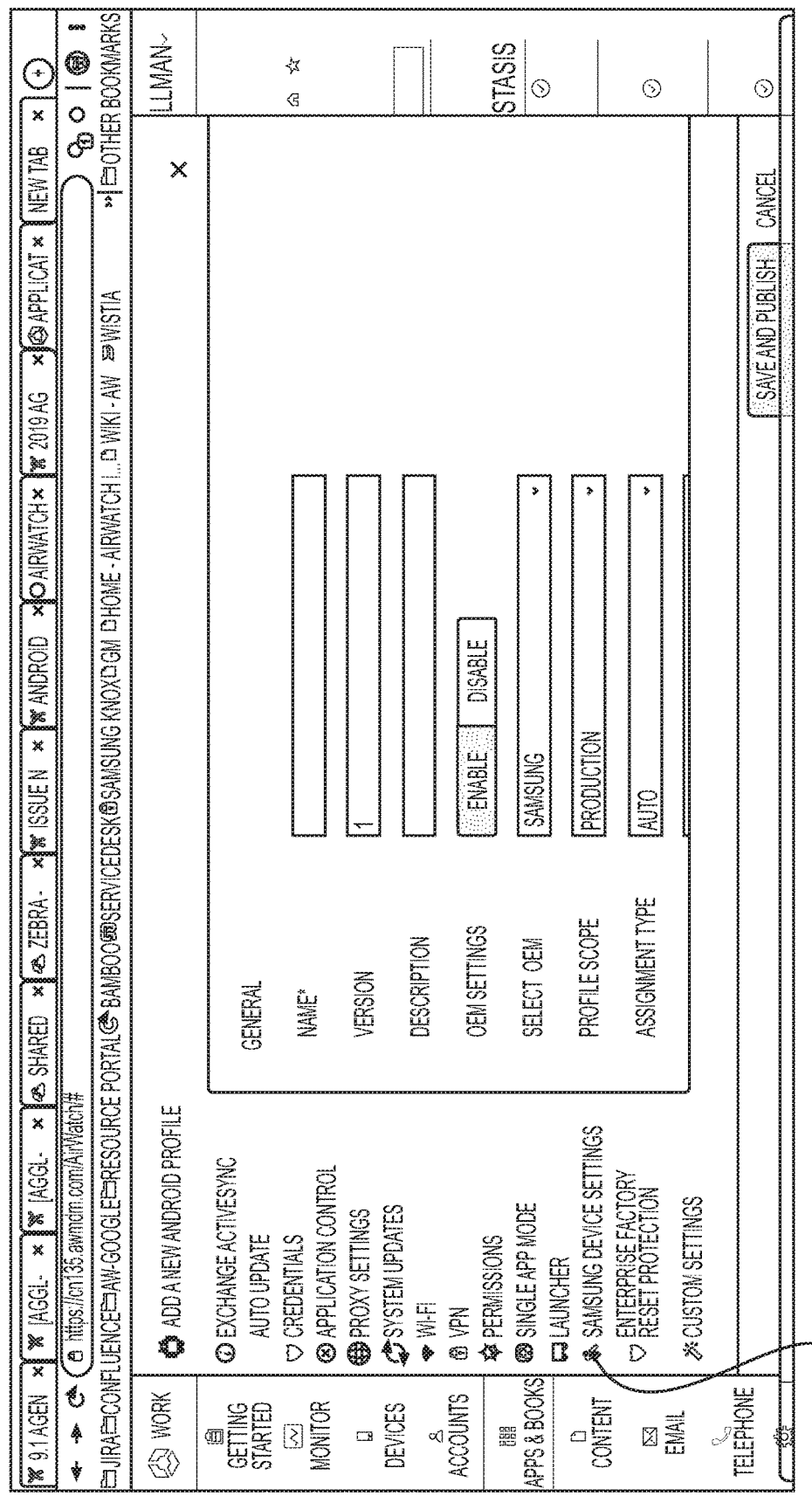
FIG. 5 is an illustration of an example user interface for configuring settings across one or more user devices.

FIG. 5 shows a screen 500 of DDUI after the administrator has enabled "OEM Settings" within the "General" payload and identified at least one device type with which the profile will be associated. Without further input or instructions from the administrator, the input device type information can be transmitted to a management server and that information can be used to request a schema file associated with the device type from an application repository, as described above.

The schema file contains information pertaining to all available configuration options for the device type and the management server uses that information to populate the DDUI displayed at the administrator console. In FIG. 5, the result at DDUI of receiving the administrator's device type selection is the creation of a new device-specific payload, shown here as "SAMSUNG Device Settings."

Figure 6A:
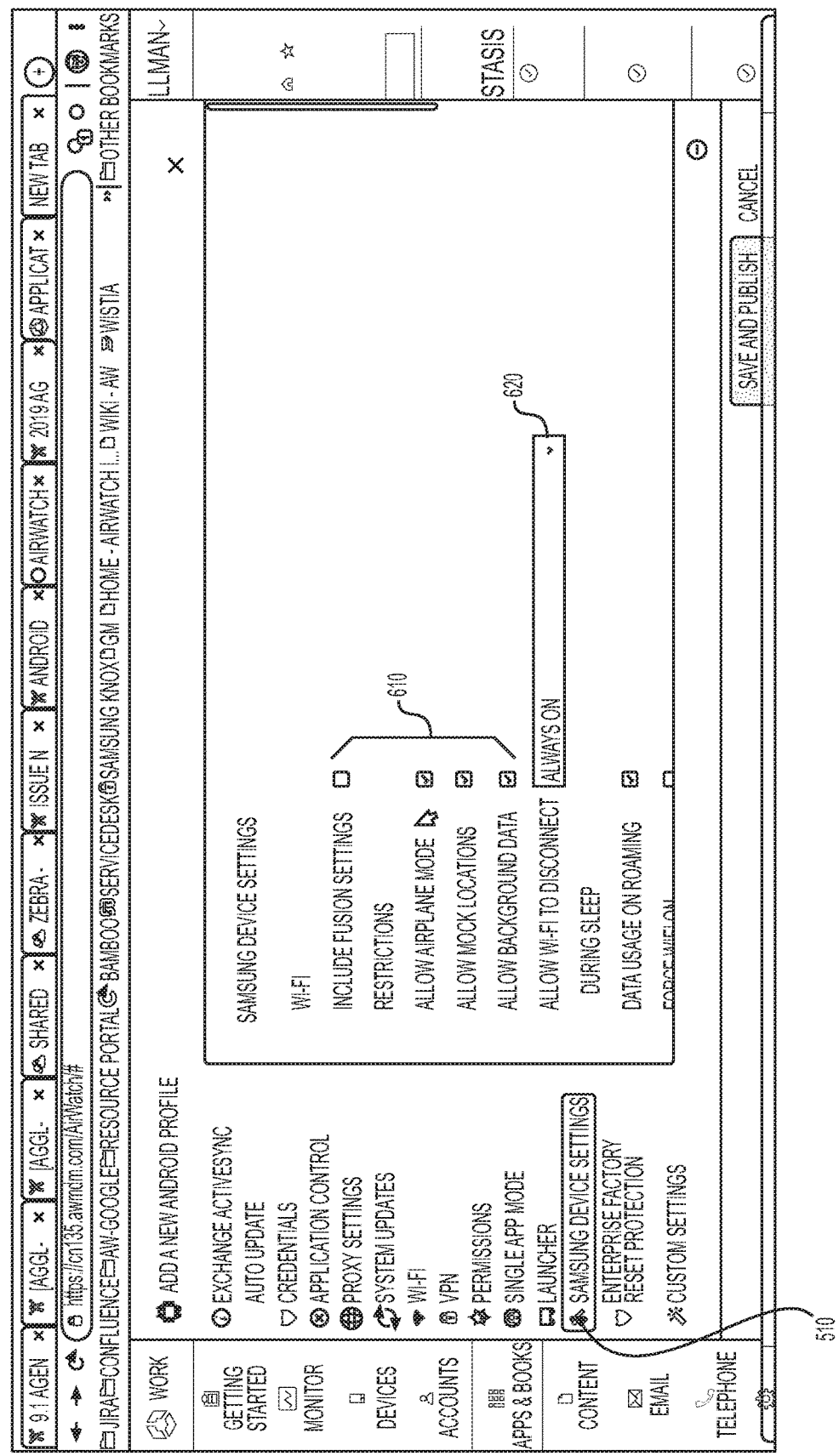
FIGS. 6A-6C are illustrations of example user interfaces for configuring settings across one or more user devices.
Figure 7:
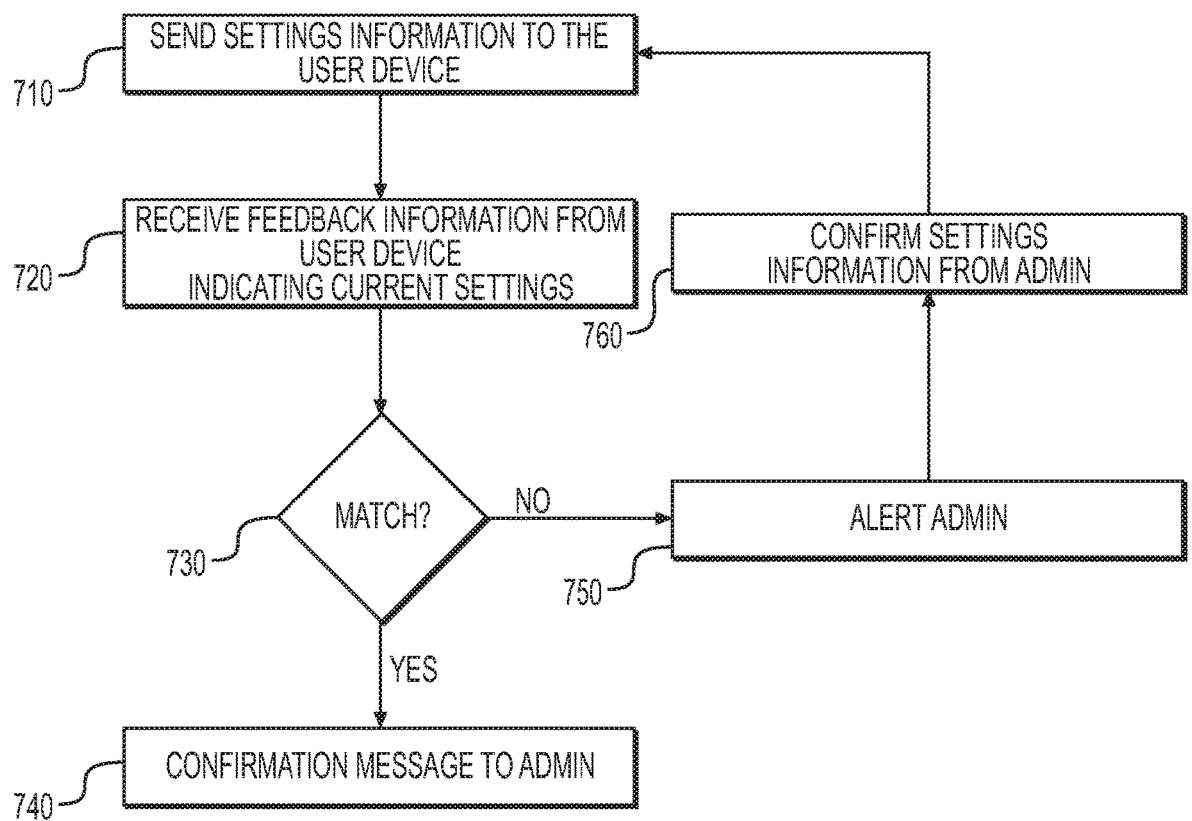
FIG. 7 is a flowchart of an example method for configuring settings across one or more user devices.

Selection of the newly available device settings payload 510 by the administrator can cause screen 600 to be displayed at the administrator console, as shown in FIG. 6A. The device settings payload 510 includes all configuration options made available by the device manufacturer. The DDUI displays the available configuration options using any combination of suitable input and selection fields. For example, FIG. 6A depicts on/off elements 610 that are available for configuring WI-FI and communication restriction options. A choice type drop-down menu 620 is also shown under the communication restriction options.

Figure 6B:
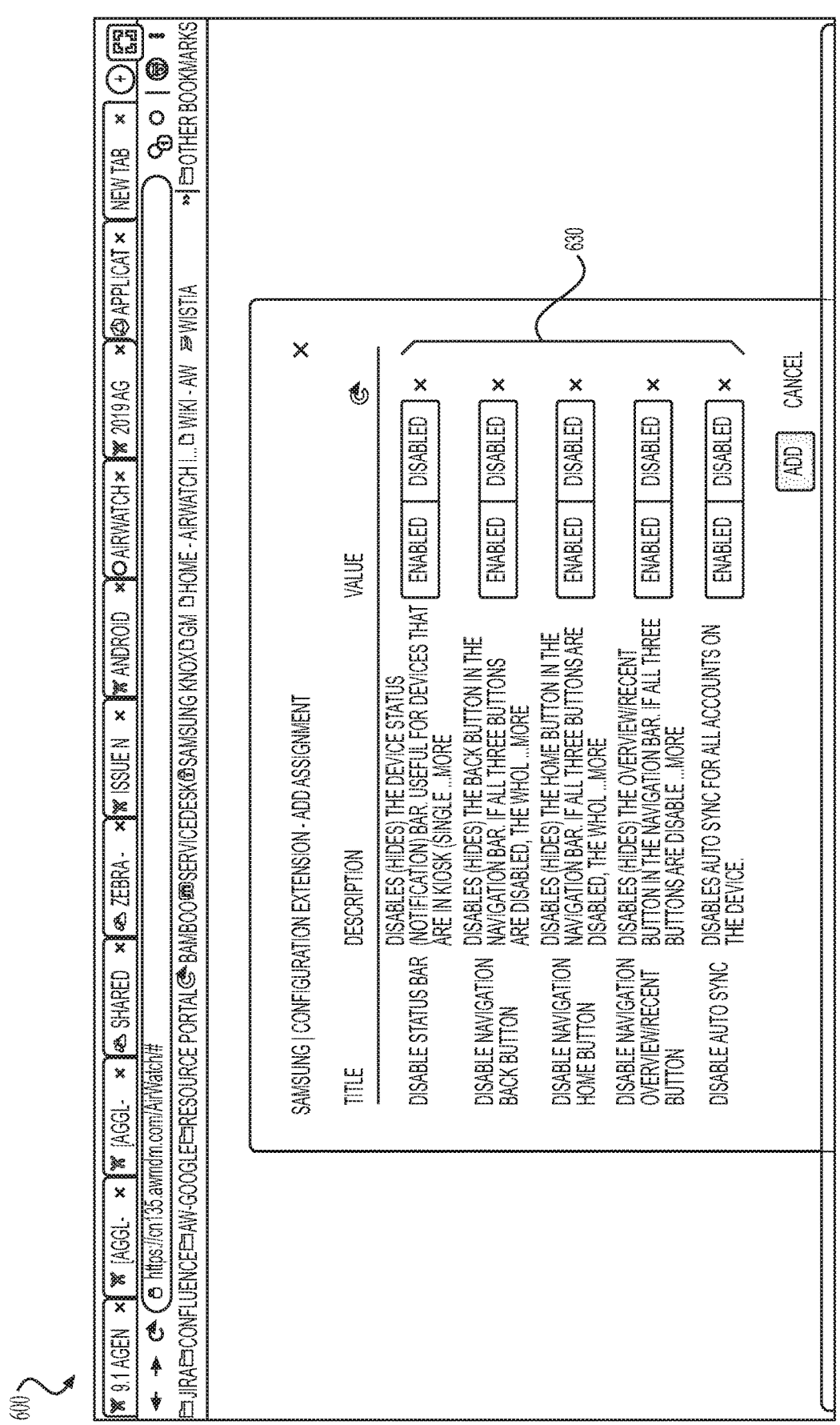
Figure 6C:
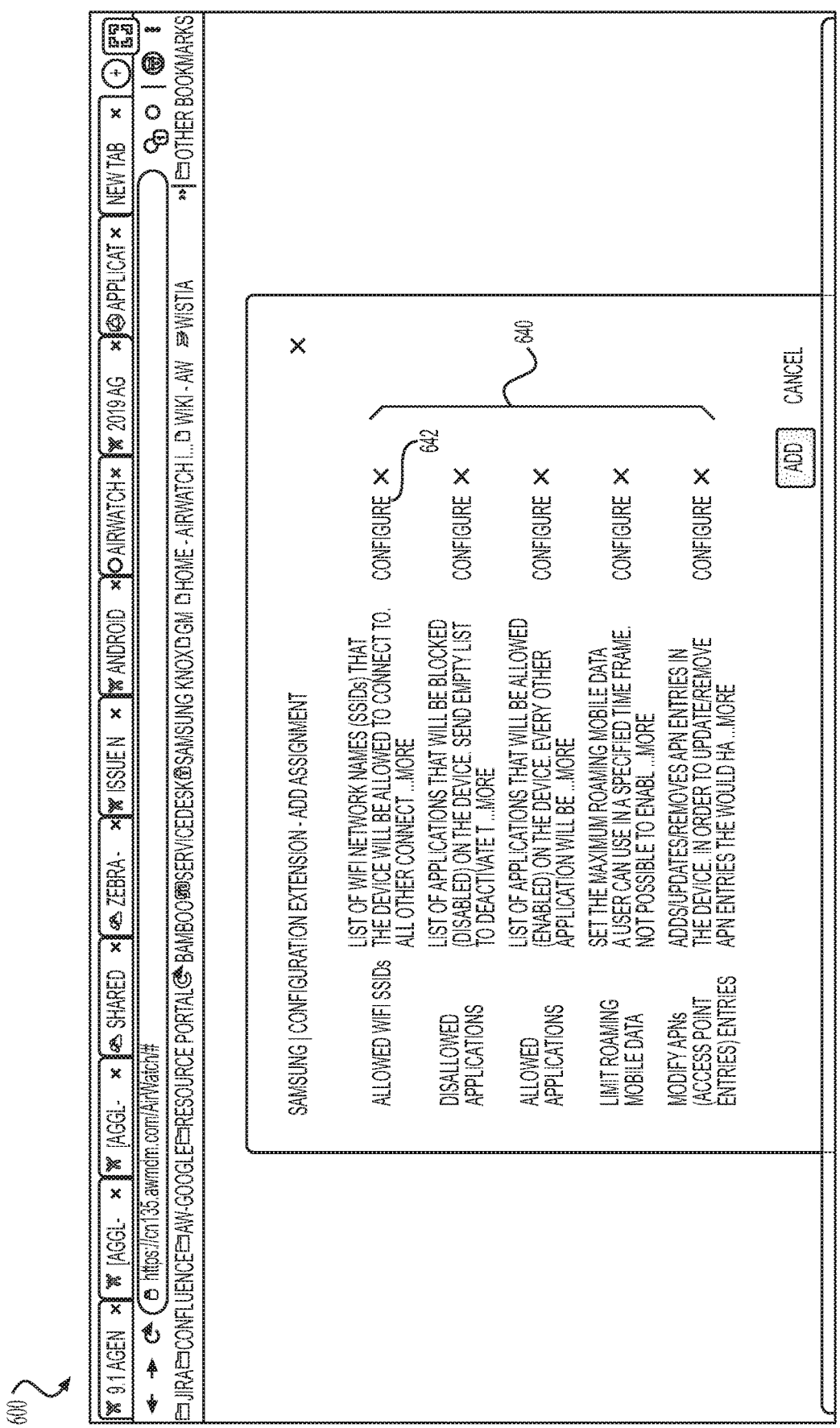

FIGS. 6B and 6C depict other portions of screen 600 (for example, after the administrator has scrolled down through the payload options depicted in FIG. 6A). FIG. 6B depicts choice type elements 630 for disabling specific functions on the devices to which the profile will be applied. FIG. 6C, on the other hand, depicts a number of bundle arrays 640. Selecting the "Configure" element for any of these bundle arrays can cause another subset of configurable options to be displayed within the DDUI. For example, selecting "Configure" element 642 can cause a subset of options related to WI-FI network permissions to appear. Like the other configuration options shown in FIGS. 6A-6C, the WI-FI network permissions options can be presented as one or more elements or fields, including character string fields, parameter value fields, choice types, multi-select options, and bundle arrays.

After the administrator has provided input for one or more of the available device configuration options, the device settings information can be transmitted to the management server. For example, after the administrator providing input for one or more available device configuration options under the device settings payload, the device settings information can be sent to the management server when the administrator selects a different payload to configure or when the administrator provides an instruction to deploy the settings information to one or more user devices.

Upon receipt of the settings information and the instruction to deploy the settings across the identified user devices, the management server can instruct the user devices to download the device configuration application from the application repository and either send the settings information to the agent application residing on each user device or to the application repository. The device configuration application is downloaded to the user device and the settings information is applied to the configuration application either by the agent application residing on the user device or by the application repository. This deployment process is described in more detail above.

Further examples of the methods and systems presented above can include receiving feedback from configured user devices to ensure compliance with the settings information established by the administrator. FIG. 7 provides a flowchart of an example method for receiving such feedback and ensuring compliance.

At step 710, the user device (or the application repository, as described above with respect to alternative embodiments) receives the device settings information established by the administrator from the management server. Further included in this step, is confirming that the device configuration application is present on the device, and if not, downloading the device configuration application from either the application repository or the management server. Then the settings information can be applied to the device configuration application by an agent application installed on the user device (or the application repository, as the case may be), in some examples.

At step 720, the user device can periodically transmit feedback information pertaining to the current settings applied to the device configuration application. This periodic feedback can be sent upon receiving a request from the management server or it can be sent according to a predetermined schedule or at some predetermined frequency. The feedback information can be sent directly to the management server or it can be sent first to the application repository and retrieved from there by the management server. The feedback information can be transmitted by the agent application or the device configuration application, for example, and can include any information relevant to the device. For example, the feedback information can include information regarding the location of the device, the battery level of the device, the type of VPN or WIFI network(s) to which the device is connected, the applications installed on the device, or any other relevant information.

The management server or the application repository can then compare the current settings pertaining to the device configuration application with the most recent settings information received from the administrator console at step 730. If the two sets of settings information match, then a confirmation message can be sent to the administrator console at step 740 and no further action is necessary.

If the two sets of settings information do not match, then at step 750, an alert message can be transmitted from the management server to the administrator console informing the administrator that one or more user devices have not been configured in compliance with the previously established profile. In some examples, the alert can contain information identifying which user devices are not in compliance and a summary of the particular settings of the current user devices that do not match the settings information configured by the administrator. In some examples, an alert can also be provided to the user, such as by displaying a notification through the operating system of the user device.

The administrator can be afforded an opportunity to review the alert message content and confirm that the one or more user devices are not in compliance at step 760. Upon receipt of the administrator's confirmation at the management server, at step 710, the management server can re-send the settings information either directly to the affected user devices 130 or to the application repository 140 for application to the affected user devices 130. In some examples, the settings information is re-sent to the agent application residing at the affected user devices. In addition to re-sending the settings information to the affected user devices, the management server or application repository can send instructions to the user device (or agent application, if applicable) to re-apply the settings information to the device configuration application. This process can be repeated until each user device to which the settings information has been applied transmits current settings information that matches the settings information configured by the administrator.

In alternative embodiments, at step 730, if the management server or the application repository compare the current settings pertaining to the device configuration application of a device with the most recent settings information received from the administrator console and determine that the two sets of settings information do not match, then rather than progressing through steps 750 and 760 described above, the process may move straight to repeating step 710 where the management server or application repository can re-send the correct settings information to the user device, as described above.

Other examples of the disclosure will be apparent to those skilled in the art from consideration of the specification and practice of the examples disclosed herein. For example, while the disclosure has described example systems and method for configuring device settings across a number of managed devices, the same process can be used to configure application settings across the same devices. Applications that the administrator may desire to install and configure on the user devices can be provided in, for example, a drop-down menu in the DDUI similar to the device type drop-down menu depicted in FIG. 4 (item 440). In a further example, the drop-down menu could include multi-select options and each application selected by the administrator could result in a new, application-specific payload being added to the DDUI similar to the device-specific payload added in FIG. 5 (item 510).

In this manner, all device and application settings can be configured within the same DDUI and as part of an administrator's workflow for creating or editing a profile to be applied to one or more devices across an enterprise or organization. The administrator need not take any affirmative steps to ensure that the desired applications are downloaded to each applicable user device, as the management server automatically sends each user device instructions to download the appropriate applications before, during, or after the management server sends the settings information to the agent application of each user device.

Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather, any feature of any example described here can be incorporated into any other suitable example. It is intended that the specification and examples be considered as illustrative only, with a true scope and spirit of the disclosure being indicated by the following claims.

What is claimed is:

1. A method for configuring settings on a user device, the method comprising:
   receiving, at a device management server, information indicating a device type corresponding to a user device;
   sending a request from the management server to an application store for a schema file associated with a configuration application for the device type, the configuration application being stored at the application store;
   generating, by the management server, a user interface for display at an administrator console based on the schema file received at the management server, the user interface including a plurality of device configuration options for the configuration application;
   receiving, at the device management server, information from the administrator console including settings to be applied to the configuration application when operating on the user device, the settings configured at the administrator console without direct access to the configuration application stored at the application store;
   sending, from the management server, the settings to be applied to the configuration application when operating on the user device to either the user device or the application store; and
   sending, from the management server, instructions to the user device to download the configuration application from the application store.

2. The method of claim 1, wherein the displaying the user interface at the administrator console includes displaying a plurality of device configuration payloads, at least one of which is specific to the device type.

3. The method of claim 1, wherein the sending, from the management server, the settings to be applied to the user device to either the user device or the application store includes sending the settings to an agent application installed on the user device and the agent application applying the settings to the configuration application.

4. The method of claim 1, wherein the sending, from the management server, the settings to be applied to the user device to either the user device or the application store includes sending the settings to the application store and the application store applying the settings to the configuration application.

5. The method of claim 1, wherein the information indicating a device type corresponding to the user device is received from the administrator console and causes a new configuration payload to be generated and displayed on the user interface.

6. The method of claim 1, further comprising receiving, at the management server, feedback information from the user device indicating current settings applied to the user device.

7. The method of claim 6, further comprising determining that the current settings do not match the settings received from the administrator console and instructing the user device to update the current settings.

8. A non-transitory, computer-readable medium comprising instructions that, when executed by a processor, performs stages for configuring settings on a user device, the stages comprising:
   receiving, at a device management server, information indicating a device type corresponding to a user device;
   sending a request from the management server to an application store for a schema file associated with a configuration application for the device type, the configuration application being stored at the application store;
   generating, by the management server, a user interface for display at an administrator console based on the schema file received at the management server, the user interface including a plurality of device configuration options for the configuration application;
   receiving, at the device management server, information from the administrator console including settings to be applied to the configuration application when operating on the user device, the settings configured at the administrator console without direct access to the configuration application stored at the application store;
   sending, from the management server, the settings to be applied to the configuration application when operating on the user device to either the user device or the application store; and
   sending, from the management server, instructions to the user device to download the configuration application from the application store.

9. The method of claim 8, wherein the displaying the user interface at the administrator console includes displaying a plurality of device configuration payloads, at least one of which is specific to the device type.

10. The method of claim 8, wherein the sending, from the management server, the settings to be applied to the user device to either the user device or the application store includes sending the settings to an agent application installed on the user device and the agent application applying the settings to the configuration application.

11. The method of claim 8, wherein the sending, from the management server, the settings to be applied to the user device to either the user device or the application store includes sending the settings to the application store and the application store applying the settings to the configuration application.

12. The method of claim 8, wherein the information indicating a device type corresponding to the user device is received from the administrator console and causes a new configuration payload to be generated and displayed on the user interface.

13. The method of claim 8, further comprising receiving, at the management server, feedback information from the user device indicating current settings applied to the user device.

14. The method of claim 13, further comprising determining that the current settings do not match the settings received from the administrator console and instructing the user device to update the current settings.

15. A system for configuring settings on a user device, the system comprising:
   a memory storage including a non-transitory, computer-readable medium comprising instructions; and
   a computing device including a processor that executes the instructions to carry out stages comprising:
      receiving, at a device management server, information indicating a device type corresponding to a user device;
      sending a request from the management server to an application store for a schema file associated with a configuration application for the device type, the configuration application being stored at the application store;
      generating, by the management server, a user interface for display at an administrator console based on the schema file received at the management server, the user interface including a plurality of device configuration options for the configuration application;
      receiving, at the device management server, information from the administrator console including settings to be applied to the configuration application when operating on the user device, the settings configured at the administrator console without direct access to the configuration application stored at the application store;
      sending, from the management server, the settings to be applied to the configuration application when operating on the user device to either the user device or the application store; and
      sending, from the management server, instructions to the user device to download the configuration application from the application store.

16. The method of claim 15, wherein the displaying the user interface at the administrator console includes displaying a plurality of device configuration payloads, at least one of which is specific to the device type.

17. The method of claim 15, wherein the sending, from the management server, the settings to be applied to the user device to either the user device or the application store including sending the settings to an agent application installed on the user device and the agent application applying the settings to the configuration application.

18. The method of claim 15, wherein the sending, from the management server, the settings to be applied to the user device to either the user device or the application store includes sending the settings to the application store and the application store applying the settings to the configuration application.

19. The method of claim 15, wherein the information indicating a device type corresponding to the user device is received from the administrator console and causes a new configuration payload to be generated and displayed on the user interface.

20. The method of claim 15, further comprising receiving, at the management server, feedback information from the user device indicating current settings applied to the user device.

* * * * *